United States Patent [19]

Osburn et al.

[11] Patent Number: 4,880,028

[45] Date of Patent: Nov. 14, 1989

[54] COMPLETION MACHINE

[75] Inventors: Coy D. Osburn; James B. Sullivan, both of Tulsa, Okla.

[73] Assignee: TDW Delaware, Inc., Wilmington, Del.

[21] Appl. No.: 305,613

[22] Filed: Feb. 3, 1989

[51] Int. Cl.$^4$ .......................... F16K 43/00; F16L 55/12
[52] U.S. Cl. ................... 137/315; 29/157.1 R; 29/402.08; 116/277; 116/DIG. 21; 137/318; 137/554; 138/89; 138/94; 403/118; 408/83.5
[58] Field of Search ................ 116/201, 277, DIG. 21; 29/157.1 R, 402.08; 138/30, 89, 93, 94; 137/97, 315, 317, 318, 554; 408/83.5, 99, 100, 110, 111, 126, 129, 130, 136; 403/59, 118, 359

[56] References Cited

U.S. PATENT DOCUMENTS

| | | | |
|---|---|---|---|
| 2,413,273 | 12/1946 | Wilhide | 403/359 |
| 2,885,232 | 5/1959 | Eberly | 403/359 |
| 3,287,031 | 11/1966 | Simmons et al. | 403/359 |
| 3,614,252 | 10/1971 | Rose | 408/9 |
| 3,789,875 | 2/1974 | McGee | 137/554 |
| 4,019,541 | 4/1977 | Koppl | 138/94 |
| 4,184,504 | 1/1980 | Carmichael et al. | 137/318 |
| 4,291,727 | 9/1981 | Yie et al. | 137/318 |
| 4,503,879 | 3/1985 | Lazarus | 138/94 |
| 4,693,278 | 9/1987 | Wilson et al. | 138/89 |
| 4,784,182 | 11/1988 | Sugimura | 138/30 |

Primary Examiner—George L. Walton
Attorney, Agent, or Firm—Head & Johnson

[57] ABSTRACT

For use in a hot tapping system having a plug receiving flange providing communication into the interior of a pipeline, a completion machine for attachment to the flange providing means to install or retrieve a plug from within the flange, the machine being formed of an elongated cylindrical housing having a flange portion to removably sealably engage the plug receiving flange and the housing forming a hydraulic cylinder, an elongated tubular control bar reciprocally and non-rotatably received within the housing, a piston within the cylinder secured to the control bar by which the control bar is hydraulically displaced, and a rotatable retention rod telescopically received within the control bar and having a threaded end to attach to a plug, the retention rod being secured to a plug for placement of the plug into a flange or the removal therefrom.

7 Claims, 4 Drawing Sheets

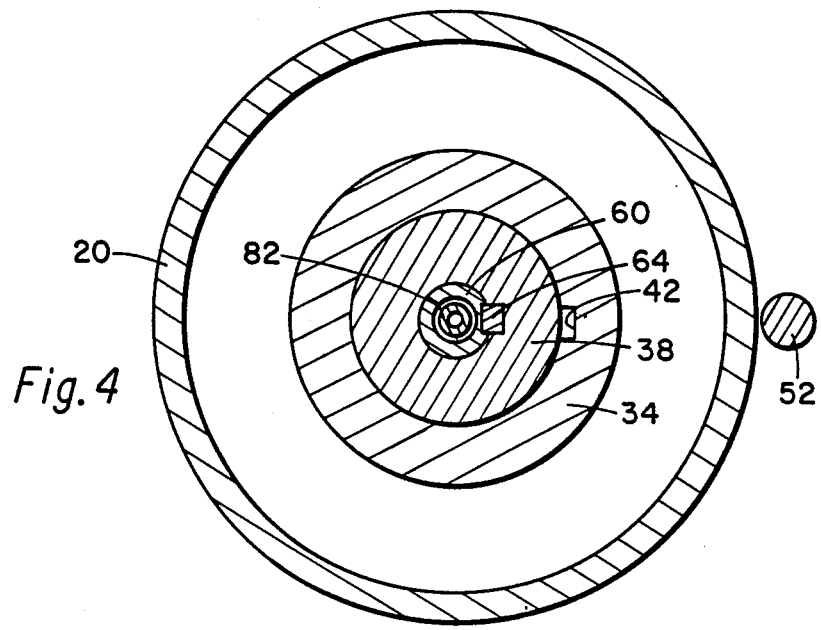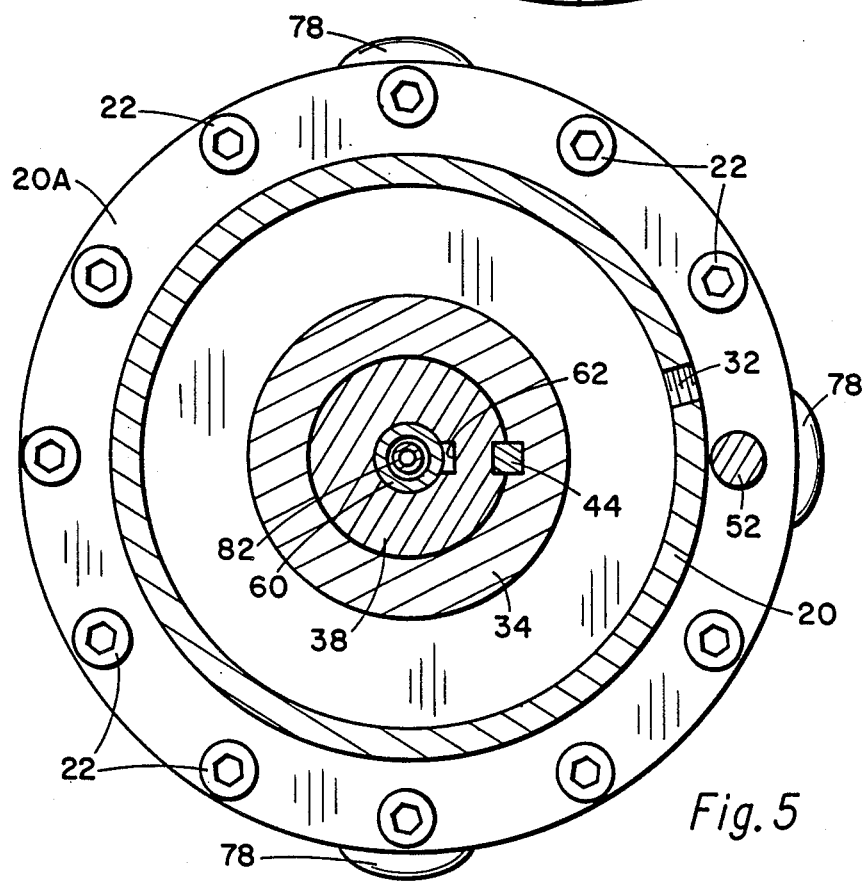

COMPLETION MACHINE

SUMMARY OF THE INVENTION

This invention relates to a machine for use in conjunction with a system for tapping, plugging and completing an opening in a pipeline. The completion machine of this invention is particularly useful in a system which permits a pipeline to be hot tapped, that is, tapped while under full operating pressure.

When it is necessary to provide entrance into a pipeline where no entrance has previously existed, such as for plugging off the pipeline or for providing a temporary branch line connection, a flange is first welded to the exterior of the pipeline. The flange is welded in such a way as to provide a leak-proof closure around the pipeline with an opening in the top of the flange exposing the exterior of the pipeline within the flange. A sandwich valve is then affixed to the flange which can be opened and closed. A tapping machine is attached to the top of the sandwich valve. The valve is opened and a cutter is rotatably extended by the tapping machine through the opened valve and through the flange into engagement with the external cylindrical surface of the pipeline. The cutter is rotated and axially advanced until an opening is cut into the wall of the pipeline. The cutting bar is retracted and the sandwich valve is closed. The cutting machine is then removed from the sandwich valve.

These operations provide an accessible opening into the pipeline. A branch pipe can be attached to the sandwich valve providing a means of diverting fluid flow from within the pipeline through the valve and through the branch line. Other operations can be conducted, such as inserting a plug into the pipeline.

After these or similar operations are completed, the standard procedure is that the sandwich valve should be removed from the pipeline. For this purpose, a completion machine is employed. The present invention is an improved completion machine for use in a hot tapping, plugging and completion system.

The completion machine is used to insert a plug into or remove a plug from a flange fitting which has been secured to a pipeline. For examples of the type of plugs which can be used to close a flange, see the following United States patents:

(1). 3,776,947 entitled "Fluid Tight Closure", issued Oct. 23, 1973;

(2). 4,387,740 entitled, "Cam-Flange", issued June 14, 1983;

(3). 4,466,550 entitled, "Closure For A Cylindrical Opening Having Improved Venting Means", issued Aug. 24, 1984; and (4). 4,693,274 entitled "Safety Closure Member", issued Sept. 15, 1987. These four U.S. Patents are incorporated herein by reference.

For reference to tapping machines which are used to provide an opening into the wall of a pipeline through a flange welded to the exterior of the pipeline, reference may be had to Patent 3,614,252, entitled "Tapping Apparatus", issued Oct. 19, 1971.

The completion machine of this invention includes an elongated cylindrical housing having a flange on the lower end which is adaptable to removably and sealably engage a sandwich valve which provides a closeable access into the interior of a pipeline. The cylindrical housing forms a hydraulic cylinder having a fluid inlet port and a fluid outlet port.

An elongated tubular control bar extends from the housing. The control bar has an axial opening through it and is secured within the cylindrical housing so that it is non-rotatable, but can be reciprocally extended relative to the housing. A piston is formed as a part of the control bar and within the hydraulic cylinder. By the application of fluid pressure to the cylinder the reciprocal extension or retraction of the control bar relative to the completion machine can be achieved.

A retention rod is telescopically received in the upper end portion of the tubular control bar. Secured to the top of the cylindrical housing is a gear box and the upper end of the retention rod extends within the gear box and has a driven gear affixed to it. Rotatably received within the gear box is a drive gear and an operating rod extending from the drive gear and exterior to the completion machine housing. By rotation of the operating rod and thereby the drive gear and driven gear the retention rod is rotatable within the upper end of the housing.

A retention rod extension is received within the tubular control bar in telescoping relationship with the lower end of the retention rod. The retention rod extension moves with the control bar but the rotational position of the retention rod extension is controlled by rotation of the operating rod.

The lower end of the retention rod extension is threaded or otherwise constructed so as to removably engage a plug member of the type such as described in U.S. Pat. Nos. 3,766,947; 4,387,740; 4,466,550; and 4,693,278.

With a plug member secured to the lower end of the retention rod extension, the completion machine can be secured onto a sandwich valve or a housing which, in turn, is attached to the sandwich valve. With the valve in the opened position, the tubular control bar can be lowered, thereby lowering the flange plug into position within the pipeline flange. When in position, the retention rod and retention rod extension can be rotated by rotating the operating rod to rotate the mechanism necessary to lock the plug in position within the flange. After the locking operation has been accomplished, the control bar can be rotated in the opposite direction to disconnect the plug member from the retention rod extension. Thereafter, the control bar may be retracted, or moved upwardly with reference to the completion tool cylindrical housing. The plug closes the flange affixed to the pipeline thereby permitting first, the removal of the completion tool and then the removal of the sandwich valve. A blind flange can then be secured on the pipeline flange so that the pipeline flange is completely sealed against leakage of fluid.

The invention will be better understood with reference to the following description and claims taken in conjunction with the attached drawings.

DESCRIPTION OF THE DRAWINGS

FIG. 4 is a cross-sectional view taken along the line 4—4 of FIG. 1.

FIG. 5 is a cross-sectional view taken along the line 5—5 of FIG. 1.

DESCRIPTION OF A PREFERRED EMBODIMENT

Figure 1A:
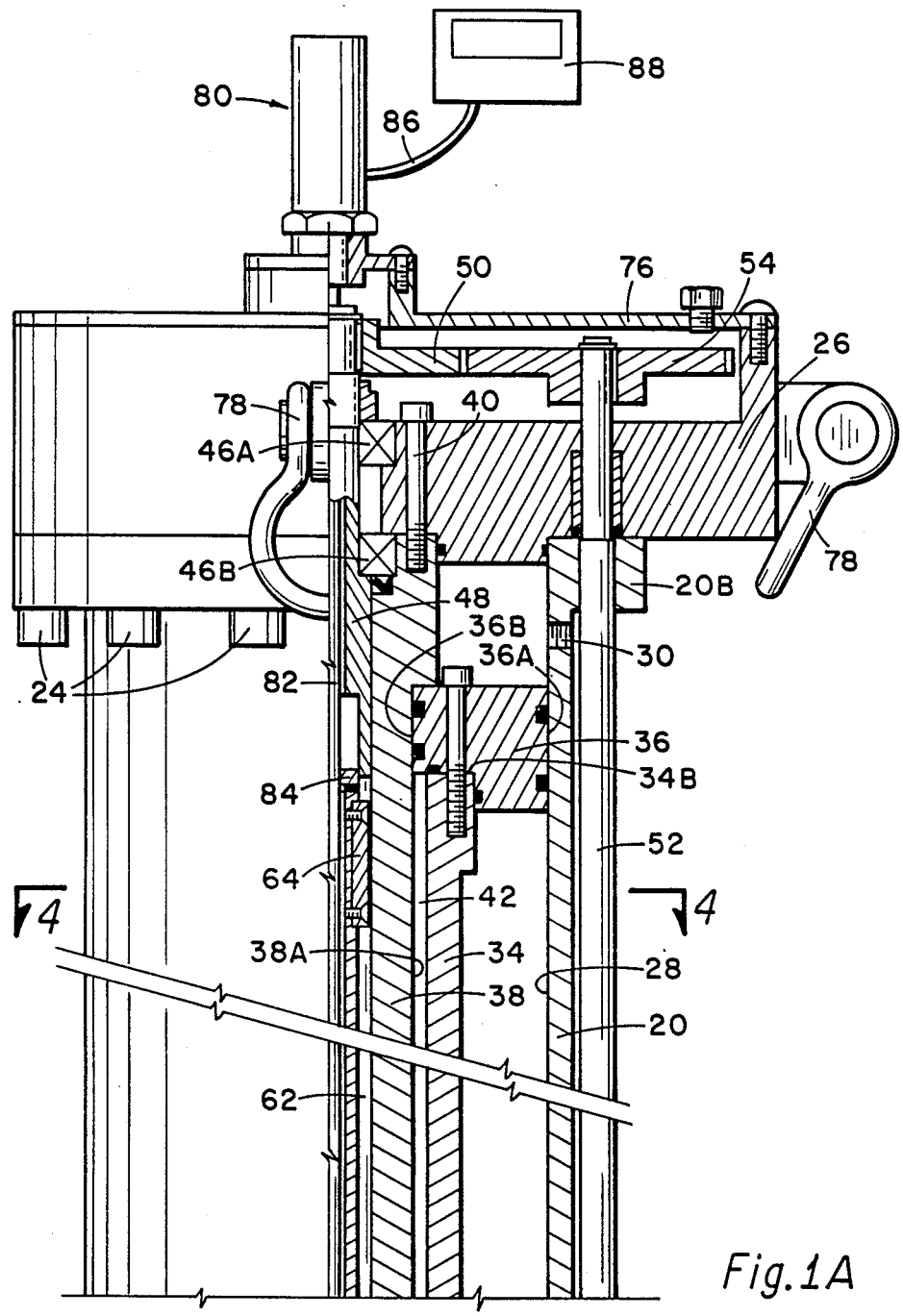
FIGS. 1A and 1B represent an external view of a completion machine employing the principles of this invention, shown partially in cross-section. The machine is shown with a lower flange so that it can be secured to a housing which, in turn, is affixed to the upper end of a sandwich valve which, in turn, is secured to a flange welded to a pipeline and through which an opening in the wall of the pipeline has been provided.
Figure 1B:
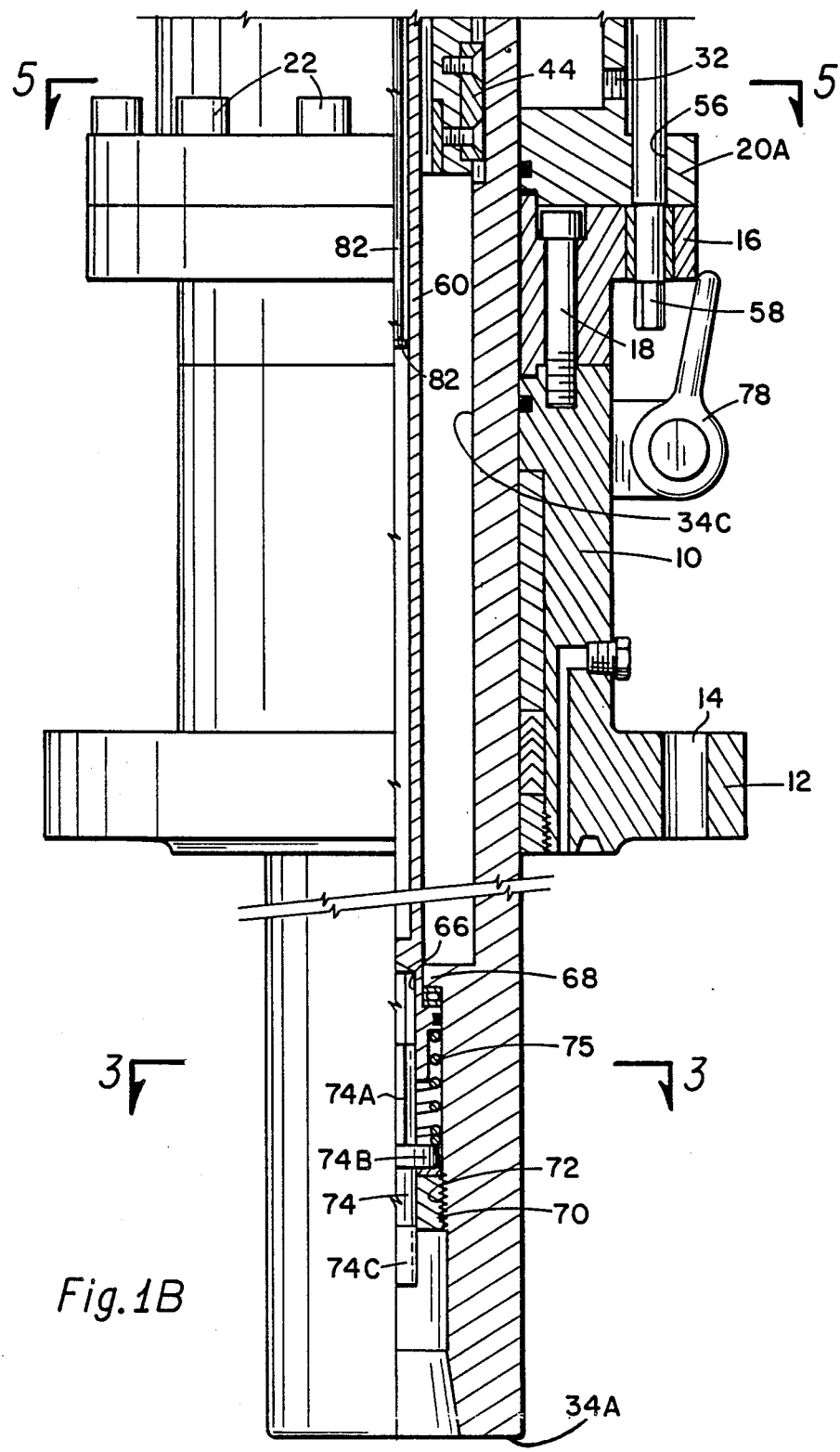
Figure 2:
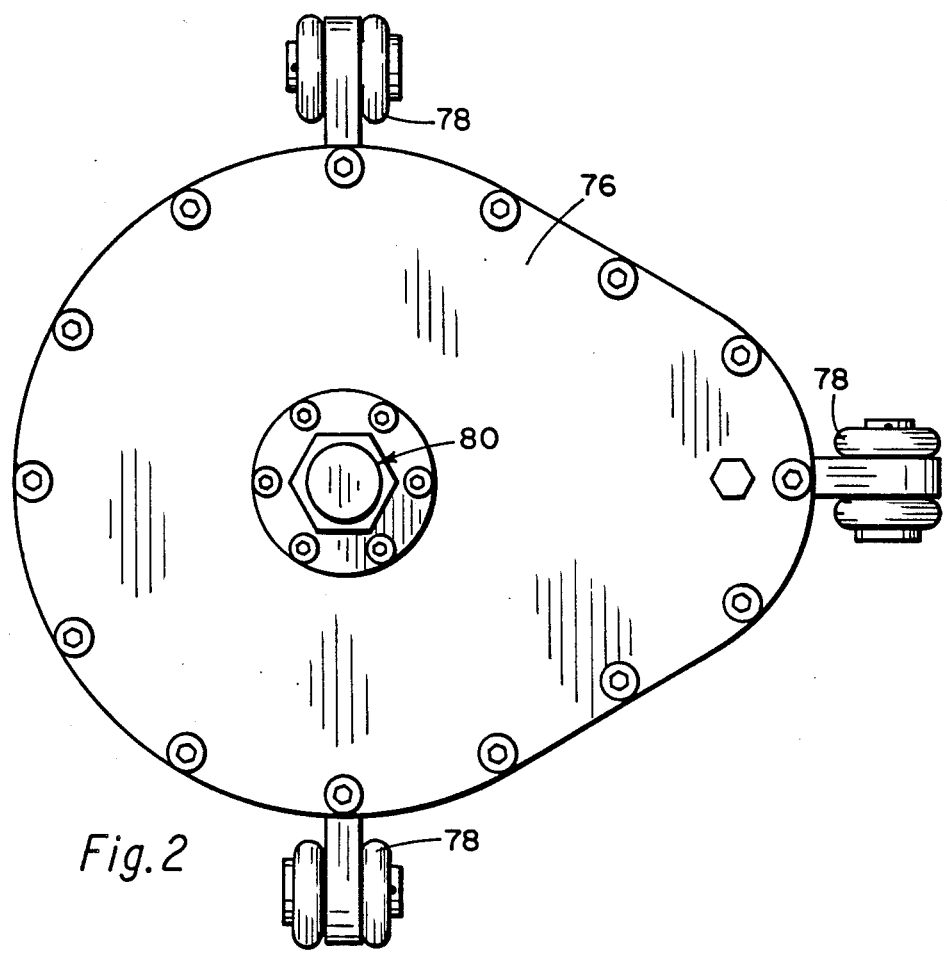
FIG. 2 is a top view of the completion tool of FIG. 1.
Figure 3:
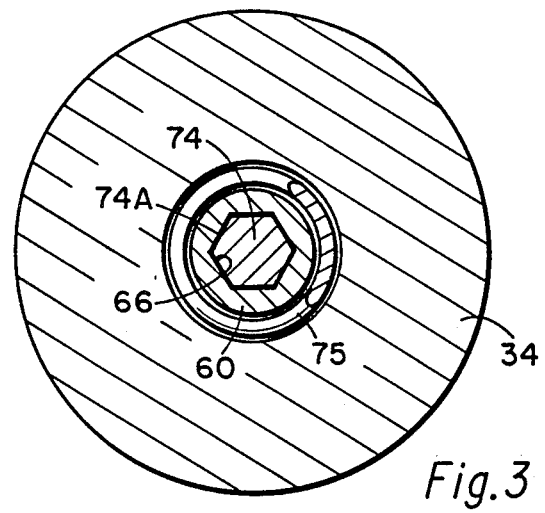
FIG. 3 is a cross-sectional view taken along the line 3—3 of FIG. 1.

Referring to the drawings, a completion tool of the type for use in a hot tapping, plugging and completion system is shown. The tool is normally used in an upright (FIG. 1B) position as illustrated, and includes a lower housing 10 which has an integral lower housing flange 12 configured for attachment to the upper surface of a sandwich valve (not shown) or, more specifically, to an adapter housing (not shown) affixed to a sandwich valve which, in turn, is secured to a locking ring flange (not shown) attached to a pipeline. The lower housing flange 14 includes spaced openings 14 which receive bolts (not shown) by which the completion tool is secured to an adaptor housing.

A connecting plate 16 which has an integral flange portion is secured to the upper end of the lower housing by means of bolts 18. Affixed to the connecting plate 16 is an upper housing 20 (FIG. 1A and 1B) which has a lower flange 20A and an upper flange 20B. The lower flange 20A provides means for attachment of the upper housing to the connecting plate 16 by means of bolts 22. Secured to the upper end of the upper housing by means of bolts 24 is a gear case 26.

The upper housing 20 is tubular and forms a hydraulic cylinder 28. An inlet port 30 at the upper end of the upper housing and an outlet port 32 at the lower end of the upper housing provide means for connection of a source of controllable hydraulic fluid pressure (not shown) to the interior of the hydraulic cylinder 28.

Telescopically received within the lower housing 10, connecting plate 16, and upper housing 20 is a tubular control bar 34. The lower end 34A of the control bar extends beyond the lower housing flange 12 while the upper end 34B has attached to it an annular piston 36. The external cylindrical surface of piston 36 sealably engages the hydraulic cylinder 28.

Secured to the gear case 26 is a tubular control bar guide 38, the upper end of the control bar guide being attached to the gear case 26 by bolts 40. The control bar guide has an external cylindrical surface 38A which is sealably and slideably engaged by the annular piston internal cylindrical surface 36B.

The control bar 34 has, in the upper end portion adjacent the upper end 34B, a groove 42 formed in the control bar internal cylindrical surface 34C. A key 44 extends from the exterior surface 38A of the control bar guide 38 and is slideably received in the groove 42 so thereby the control bar 34 is reciprocal relative to the housing but is retained in a non-rotatable condition.

Rotatably received within the gear case 26, and supported by bearing 46A and 46B is a tubular retention rod member 48. The external cylindrical surface of the retention rod 48 is of a diameter less than the internal diameter of the control bar guide 38 so that the retention rod is rotatable with respect to the control bar guide and, likewise, is rotatable with respect to the housing.

Affixed to retention rod 48 within the gear case 26 is a driven gear 50. Extending within the gear case 26 is an upper end of an operating rod 52. The operating rod has secured to it within the gear case a drive gear 54. The lower end of operating rod 52 extends through an opening 56 in the upper housing lower flange 20A. The lower end of the operating rod is provided with a hexagonal external surface 58. By means of a tool, such as a socket wrench (not shown) affixed to the hexasurface 58 the operating rod 52 can be rotated, thereby rotating drive gear 54 and driven gear 50 and as a consequence, rotating retention rod 58.

A tubular retention rod extension 60 has the upper end telescopically received within the lower end of retention rod 48. An elongated keyway or slot 62 is formed in the wall of the retention rod 48. A key 64 extends from the external surface of the retention rod extension 60 and is slideably received within slot 62. Thus, the retention rod extension 60 is telescopically secured to the lower end of the retention rod 48 and is rotated by the rotation of the retention rod.

The lower end of retention rod 60 is provided with an internal non-circular (such as Lexagonal) recess 66.

Formed in the interior tubular surface of control bar 34 is an upper reduced internal diameter flange 68 and a spaced apart lower reduced internal diameter flange 70. In the illustrated arrangement, the lower flange 70 is provided by an externally threaded nut which engages internal threads 72.

A plug retainer 74 is positioned within the lower end of the control bar. The plug retainer includes an upper non-circular cross-sectioned portion 74A which is telescopically received by the hexagonal surface 66 in the lower end of retention rod extension 60. It can be seen that the slidable mating between the plug retainer surface 74A and the recess 66 could be square, rather than hexagonal or any other shape which provides for slidable but non-rotatable engagement between the lower end of the retention rod extension 60 and the upper end portion 74A of the plug retainer.

Another portion of the plug retainer is an increased external diameter flange portion 74B. This flange portion is received between the control bar upper reduced internal diameter flange 68 and the lower reduced internal diameter flange 70 formed by the externally threaded nut.

The lower end of the plug retainer is threaded at 74C. It is this lower end which attaches to a removable plug of the type shown previously in referenced Patents 3,766,947; 4,387,740; 4,466,550; and 4,692,279 as examples. The threaded end 74C may attach directly to such plug or to a plug holder, such as shown by the element 29 in Patent 3,766,947 or element 58 in Patent 4,466,550.

A compression spring 75 urges the plug retainer 74 towards control bar lower end 34A.

The gear case 26 is closed by a cover 76. Secured to the exterior of the assembled tool are a plurality of shackles 78 by which the tool is hoisted into position onto a sandwich valve or removed from it as the tool is used during tapping and plugging operations on a pipeline.

DESCRIPTION OF OPERATION OF THE COMPLETION TOOL

Assuming that the completion tool is to be used to install a plug into a flange secured to a pipeline, the plug, or the plug adaptor, is first secured to the threaded portion 74C of the plug retainer. The completion tool with the plug secured to the lower end thereof is then positioned onto a sandwich valve or onto a housing secured to a sandwich valve and tightened into position using bolts extending through openings 14 in flange 12. The sandwich valve can then be opened, exposing the interior of the flange to be plugged. By application of hydraulic force through inlet 30, the control bar 34 is moved downwardly to position the plug affixed to the lower end thereof in the proper position within the flange. Thereafter, the retainer rod 48 and retainer rod extension 60 can be rotated by the use of a wrench affixed to the surface 58 at the lower end of operating rod 52. By rotating the plug retainer 74, the plug is set by means described in any one of the four previously mentioned patents, by way of example. After the plug is set, the rotation of the operating rod 52 may be reversed, unscrewing the plug retainer 74 from the plug. Thereafter, the completion tool may be removed.

The proper location of the plug secured to the plug retainer 74 is important, that is, the depth to which the control bar 34 must be lowered is important. This invention includes means of accurately indicating the position of the control bar. For this purpose, secured to the upper end of the housing, and specifically in the illustrated embodiment, to the top of the gear case cover 76 is a position indicator generally indicated by the numeral 80. Extending from the position indicator is an elongated small diameter cylindrical transducer element 82 which extends telescopically within the interior of the tubular retention rod 48 and retention rod extension 60.

The lower end of the transducer element is indicated by the numeral 82. Affixed adjacent the upper end of the retention rod extension 60 is a ring magnet 84 which surrounds the transducer element 82. The position indicator 80 includes an electronic system which provides a signal indicative of the position of magnet 84 relative to the transducer element 82. This signal is directed by cable 86 to a read-out 88 which is calibrated to indicate the position of the plug retainer 74 relative to the housing. Such read-out can be in inches, centimeters, etc. While observing the read-out 88, the operator can determine, by measurement previously made, when the plug is properly seated within the flange. As an example of the position indicator 80 which employs the transducer element 82 and includes a read-out 88, reference may be had to a linear position-displacement transducer system manufactured by Tempsonics, division of MTS Systems Corporation of Plainview, New York.

The tool described provides an improved hydraulically powered completion machine. The retainer rod and retainer rod extension are floating and pressure balanced with reference to the control bar. The features of the completion machine allow it to be operated at the lower end thereby avoiding the necessity of an operator having to provide an elevated work position.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use in a pipeline plugging system having a plug receiving flange providing communication into the interior of a pipeline, a completion machine for attachment to the flange providing means to install or retrieve a plug from within the flange, comprising:
   an elongated cylindrical housing having a flange means on the lower end adaptable to removably sealably engage a plug receiving flange and having therein a part a hydraulic cylinder having a fluid inlet and a fluid outlet port therein;
   an elongated tubular control bar having an axial opening therethrough and reciprocally and non-rotatably received within said housing, the control bar having an upper and a lower end;
   piston means secured to said control bar adjacent the upper end thereof and within said housing hydraulic cylinder providing means of longitudinally displacing said control bar by the application of hydraulic energy via said inlet and outlet ports;
   a retention rod telescopically received within the upper end portion of said tubular control bar;
   means externally of said housing of rotating said retention rod;
   a retention rod extension having an upper end telescopically and non-rotatably received by said retention rod and having plug retaining means at the lower end thereof to attach
   a plug therein, said plug retaining means being slidably and adjustably received within said retention rod extension during the displacement of said control bar; and
   means to retain the lower end of said retention rod extension adjacent the lower end of said control bar as said control bar is reciprocated relative to said housing.

2. A completion machine according to claim 1 wherein said plug retaining means to retain the lower end of said retention rod extension adjacent the lower end of said control bar includes:
   a plug retainer member rotatably received within the lower end of said control bar having on the lower end thereof said means to attach to said plug, and having an enlarged diameter shoulder thereon, the upper end of the plug retainer member telescopically and non-rotatably engaging the lower end of said retention rod extension, and wherein said control bar has spaced apart upper and lower reduced internal diameter flanges in said tubular opening, said plug retainer shoulder being between said reduced internal diameter flanges; and
   compression spring means received on said plug retainer member and between said shoulder and said upper reduced internal diameter flanges.

3. A completion machine according to claim 1 wherein said housing includes:
   a gear box adjacent the upper end thereof into which the upper end of said retention rod extends;
   a gear affixed to said retention rod within said gear box;
   an operating rod rotatably received externally of said housing and substantially parallel thereto and extending into said gear box;

a drive gear affixed to said operating rod within said gear box and meshing with said first mentioned gear whereby rotation of said operating rod provides said means externally of said housing of rotating said retention rod.

4. A completion tool according to claim 2 wherein said retention rod is pressure balanced irrespective of the fluid pressure within said control bar.

5. A completion tool according to claim 1 including at least one lifting lug attached to the exterior of said housing.

6. A completion tool according to claim 1 including means exterior of said housing indicating the displacement of said control bar relative to said housing.

7. A completion tool according to claim 6 wherein said retention rod and retention rod extension are tubular and the upper end of said tubular retention rod communicates with the exterior of the upper end of said housing, and wherein said means to indicate the displacement of said control bar relative to said housing includes:

a magnet secured to said retention rod extension;

an elongated cylindrical transducer telescopically and non-rotatably received within said retention rod and retention rod extension and providing an electrical signal indicative of the position of said magnet relative to the transducer; and read-out means external of said housing and connected to said transducer.

* * * * *